(12) United States Patent
Gesbert et al.

(10) Patent No.: US 6,963,619 B1
(45) Date of Patent: Nov. 8, 2005

(54) SPATIAL SEPARATION AND MULTI-POLARIZATION OF ANTENNAE IN A WIRELESS NETWORK

(75) Inventors: David J. Gesbert, Mountain View, CA (US); Peroor K. Sebastian, Mountain View, CA (US); Vinko Erceg, San Jose, CA (US); Victor Shtrom, Sunnyvale, CA (US); Sanjay Kasturia, Palo Alto, CA (US); Arogyaswami J. Paulraj, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 09/621,119

(22) Filed: Jul. 21, 2000

(51) Int. Cl.[7] .............................. H04B 7/02; H04L 1/02
(52) U.S. Cl. ...................... 375/267; 455/132; 455/101
(58) Field of Search ............................... 375/347, 346, 375/267

(56) References Cited

U.S. PATENT DOCUMENTS

| | | | |
|---|---|---|---|
| 4,554,552 A | * 11/1985 | Alford et al. | ............... 343/786 |
| 5,815,488 A | 9/1998 | Williams et al. | |
| 5,933,421 A | 8/1999 | Alamouti et al. | |
| 6,058,105 A | 5/2000 | Hochwald | |
| 6,064,662 A | 5/2000 | Gitlin et al. | |
| 6,081,566 A | * 6/2000 | Molnar et al. | ............... 375/347 |
| 6,097,771 A | 8/2000 | Foschini | |
| 6,108,565 A | * 8/2000 | Scherzer | ................. 455/562.1 |
| 6,144,711 A | 11/2000 | Raleigh et al. | |
| 6,298,092 B1 | * 10/2001 | Heath et al. | ................. 375/267 |
| 6,317,098 B1 | * 11/2001 | Andrews et al. | ............ 343/797 |
| 6,411,824 B1 | * 6/2002 | Eidson | ........................ 455/561 |
| 6,714,514 B1 | * 3/2004 | Espax et al. | ................. 370/230 |

FOREIGN PATENT DOCUMENTS

| | | |
|---|---|---|
| WO | 98/09385 | 3/1998 |
| WO | WO98/09381 | 5/1998 |

OTHER PUBLICATIONS

Paulraj, A., *Taxonomy of space-time processing for wireless networks*, IEE Proc—Radar Sonar Navig., vol. 145, No. 1, Feb. 1998.

* cited by examiner

*Primary Examiner*—Stephen Chin
*Assistant Examiner*—Harry Vartanian
(74) *Attorney, Agent, or Firm*—Michael A. Proksch

(57) ABSTRACT

The present invention includes a wireless communication system. The wireless communication system includes a plurality of transceiver antennae. Each transceiver is spatially separate from at least one other transceiver antenna. Each transceiver antenna includes a transceiver antenna polarization. At least one transceiver antenna has a polarization that is different than at least one other transceiver antenna. Each transceiver antenna transmits a corresponding data stream. The wireless communication system further includes a plurality of receiver antennae. The receiver antennae receive at least one data stream. The transceiver antenna polarization of each transceiver antenna is pre-set to optimize separability of the received data streams. A transmission channel between the transceiver antennae and the receiver antennae can be estimated with a channel matrix. The pre-set transceiver antenna polarization of each transceiver antenna can be determined by minimizing a singular value spread of the channel matrix. A pre-set receiver antenna polarization of each receiver antenna can also be determined by minimizing a singular value spread of the channel matrix.

29 Claims, 9 Drawing Sheets

SPATIAL SEPARATION AND MULTI-POLARIZATION OF ANTENNAE IN A WIRELESS NETWORK

FIELD OF THE INVENTION

The invention relates generally to wireless communications. More particularly, the invention relates to wireless communication through multiple antennae that are spatially separated and include multi-polarization for optimizing separation of transmitted and received data streams.

BACKGROUND OF THE INVENTION

Wireless communication systems commonly include information carrying modulated carrier signals that are wirelessly transmitted from a transmission source (for example, a base transceiver station) to one or more receivers (for example, subscriber units) within an area or region.

Spatial Multiplexing

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. For example, if three antennae are used at the transmitter (base transceiver station) and the receiver (subscriber unit), the stream of possibly coded information symbols is split into three independent substreams. These substreams occupy the same channel of a multiple access protocol, the same time slot in a time-division multiple access protocol, the same frequency slot in frequency-division multiple access protocol, the same code sequence in code-division multiple access protocol or the same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the receiver array, a spatial signature of each of the received signals is estimated. Based on the spatial signatures, a signal processing technique is applied to separate the signals, recovering the original substreams.

FIG. 1 shows three transmitter antenna arrays 110, 120, 130 that transmit data symbols to a receiver antenna array 140. Each transmitter antenna array includes spatially separate antennae. A receiver connected to the receiver antenna array 140 separates the received signals.

A limiting factor in the performance of spatial multiplexing systems is the ability of the receiver to separate the multiple transmitted signals. That is, the receiver antennae receive composite signals that include at least some components from each of the multiple transmitted signals. The receiver must be able to separate the composite signal into the individual signal components.

FIG. 2 shows modulated carrier signals traveling from a transmitter 210 to a receiver 220 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. Fading causes the modulated carrier signal to attenuate in amplitude when multiple paths subtractively combine.

Communication Diversity

Antenna diversity is a technique used in multiple antenna-based communication system to reduce the effects of multi-path fading. Antenna diversity can be obtained by providing a transmitter and/or a receiver with two or more antennae. These multiple antennae imply multiple channels that suffer from fading in a statistically independent manner. Therefore, when one channel is fading due to the destructive effects of multi-path interference, another of the channels is unlikely to be suffering from fading simultaneously. By virtue of the redundancy provided by these independent channels, a receiver can often reduce the detrimental effects of fading.

A limiting factor to the performance of communication diversity systems is the amount of correlation of the received signals with each other. The receiver detects the received signals and estimates the transmitted signal. The less de-correlated the received signals, the less accurate the estimates of the transmitted signal at the receiver.

It is desirable to have an apparatus and method that includes a multiple antenna wireless communication system that provides better separation and de-correlation of received signals than presently achievable. It is additionally desirable that the communication system be easy to implement, and allow adaptive optimization of received signal separation and received signal de-correlation.

SUMMARY OF THE INVENTION

The invention includes an apparatus and a method for wirelessly transmitting data streams from multiple antennae. Spatial separation and polarization allows the transmitted data streams to be more effectively separated and de-correlated within a receiver, thereby improving spatial multiplexing and communication diversity. The apparatus and method allows for adaptive optimization of received signal separation and received signal de-correlation.

A first embodiment of the invention includes a wireless communication system. The wireless communication system includes a plurality of transceiver antennae. Each transceiver is spatially separate from at least one other transceiver antenna. Each transceiver antenna includes a transceiver antenna polarization. At least one transceiver antenna has a polarization that is different than at least one other transceiver antenna. Each transceiver antenna transmits a corresponding data stream. The wireless communication system further includes a plurality of receiver antennae. The receiver antennae receive at least one data stream. The transceiver antenna polarization of each transceiver antenna is pre-set to optimize separability of the received data streams.

A second embodiment of the invention is similar to the first embodiment. The second embodiment further includes estimating a transmission channel between the transceiver antennae and the receiver antennae with a channel matrix. The pre-set transceiver antenna polarization of each transceiver antenna is determined by minimizing a singular value spread of the channel matrix.

A third embodiment is similar to the second embodiment. The third embodiment includes each receiver antenna being spatially separate from at least one other receiver antenna. Each receiver antenna further includes a receiver antenna polarization. At least one receiver antenna includes a polarization that is different than at least one other receiver antenna. The receiver includes electronic circuitry for estimating a transmission channel between the transceiver antennae and the receiver antennae with a channel matrix. The pre-set receiver antenna polarization of each receiver antenna is experimentally determined by minimizing a singular value spread of the channel matrix.

A fourth embodiment is similar to the first embodiment. The fourth embodiment includes the transceiver antenna polarization of each transceiver antenna being pre-set to minimize correlation between the data streams. A transmission channel between the transceiver antennae and the receiver antennae is estimated with a channel matrix. The pre-set transceiver antenna polarization of each transceiver antenna is experimentally determined by minimizing a correlation coefficient of the channel matrix.

A fifth embodiment is similar to the first embodiment. The fifth embodiment includes a transmission channel between the transceiver antennae and the receiver antennae being estimated with a channel matrix. The pre-set receiver antenna polarization of each receiver antenna is experimentally determined by minimizing a correlation coefficient of the channel matrix.

A sixth embodiment includes a method of wirelessly communicating between a transceiver and a receiver within a wireless communication system. The transceiver includes a plurality of transceiver antennae. Each transceiver antenna is spatially separate from at least one other transceiver antenna. Each transceiver antenna further includes a transceiver antenna polarization. At least one transceiver antenna has a polarization that is different than at least one other transceiver antenna. The receiver includes a plurality of receiver antennae. The method includes each transceiver antenna transmitting a corresponding data stream. The receiver antennae receive at least one data stream. Electronic circuitry within the receiver estimates a transmission channel between the transceiver antennae and the receiver antennae with a channel matrix. The transceiver antenna polarization of each transceiver antenna is pre-set by minimizing a singular value spread of the channel matrix.

Other aspects and advantages of the present invention will become apparent from the following detailed description, taken in conjunction with the accompanying drawings, illustrating by way of example the principles of the invention.

DETAILED DESCRIPTION

Figure 1:
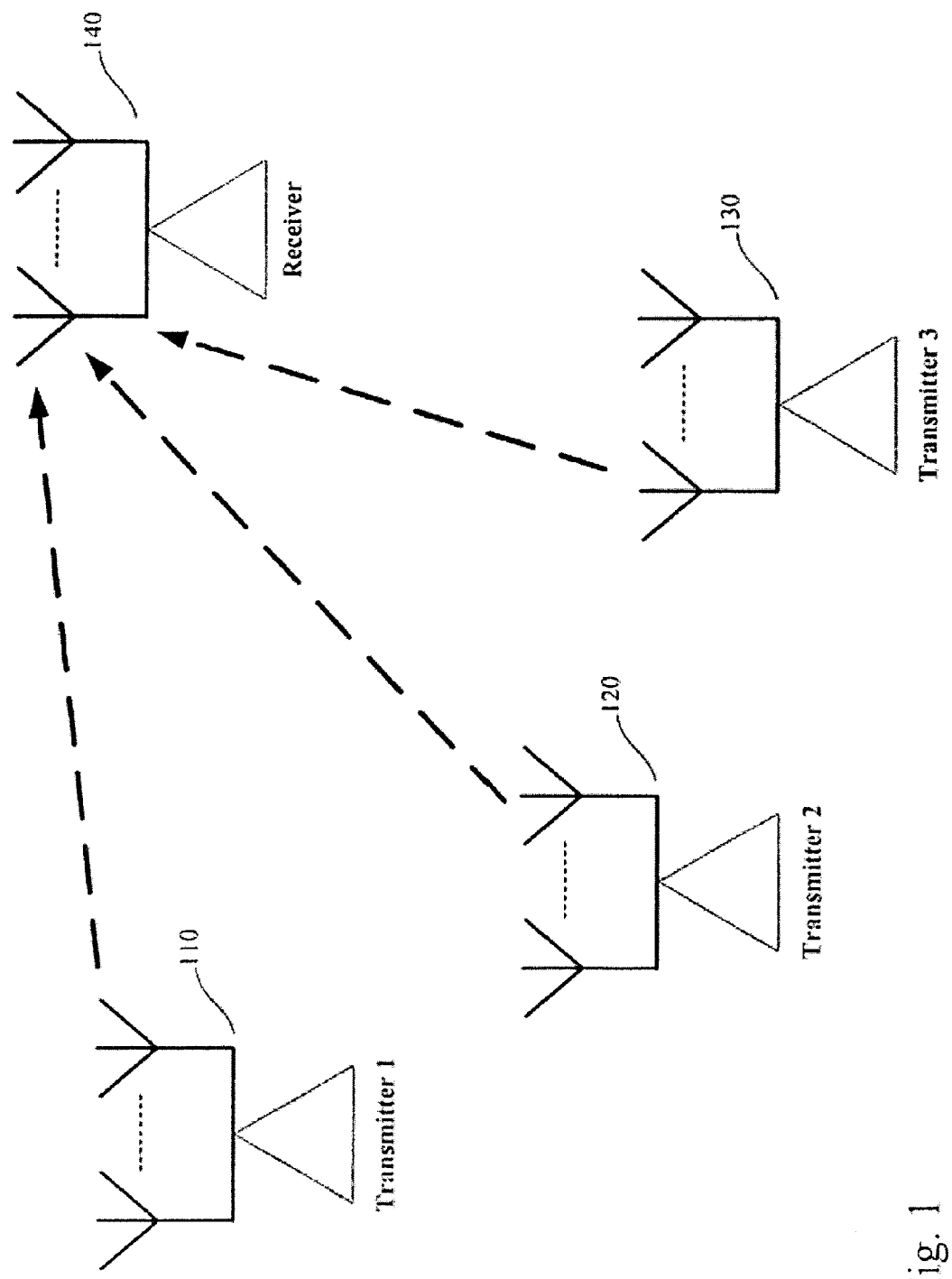
FIG. 1 shows a prior art wireless system that include spatially separate transmitters.
Figure 2:
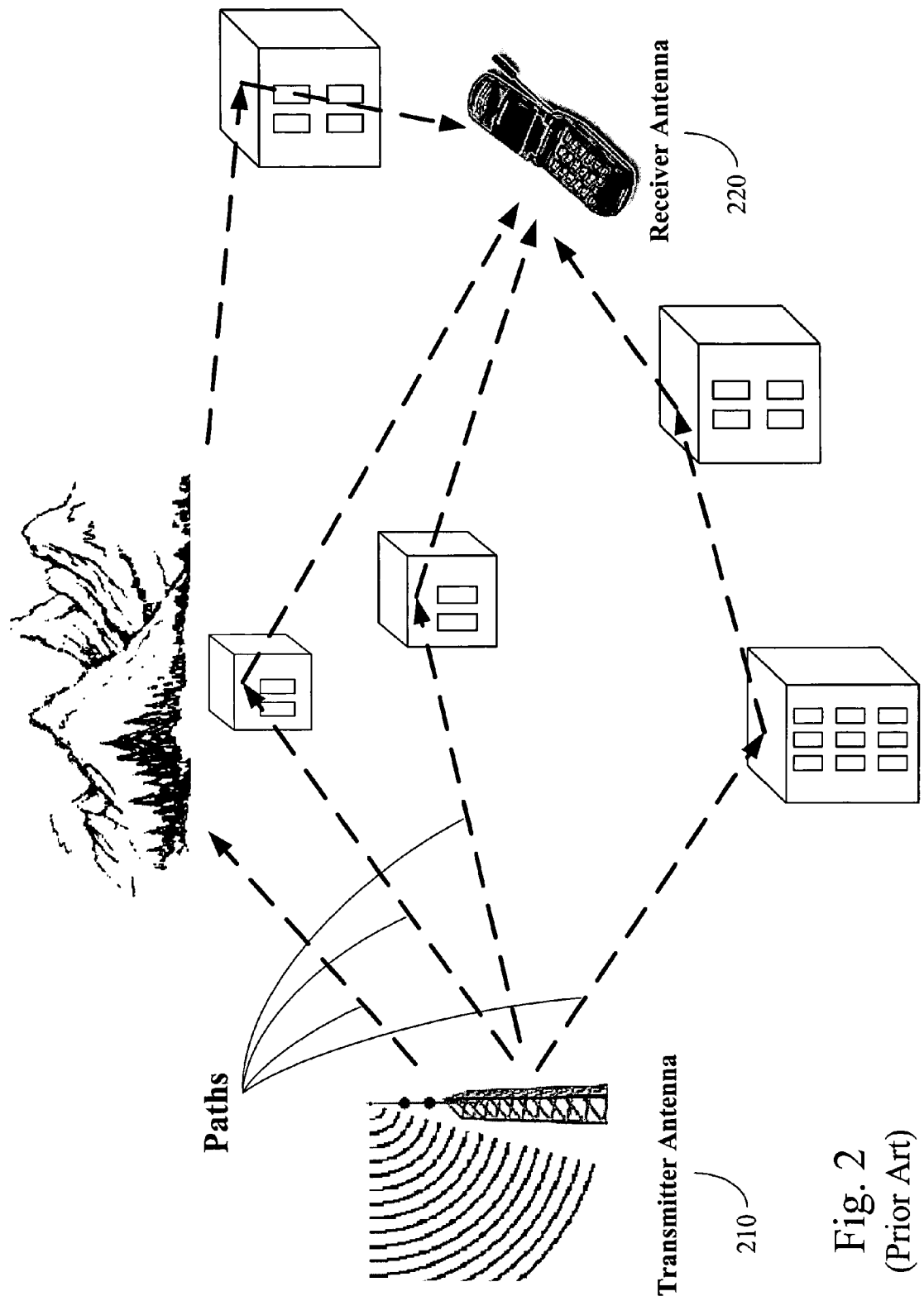
FIG. 2 shows a prior art wireless system that includes multiple paths from a system transmitter to a system receiver.

As shown in the drawings for purposes of illustration, the invention is embodied in an apparatus and a method for wirelessly transmitting data streams from multiple antennae. Spatial separation and polarization allows the transmitted data streams to be more effectively separated and de-correlated within a receiver, thereby improving spatial multiplexing and communication diversity. The apparatus and method allows for adaptive optimization of received signal separation and received signal de-correlation.

Figure 3:
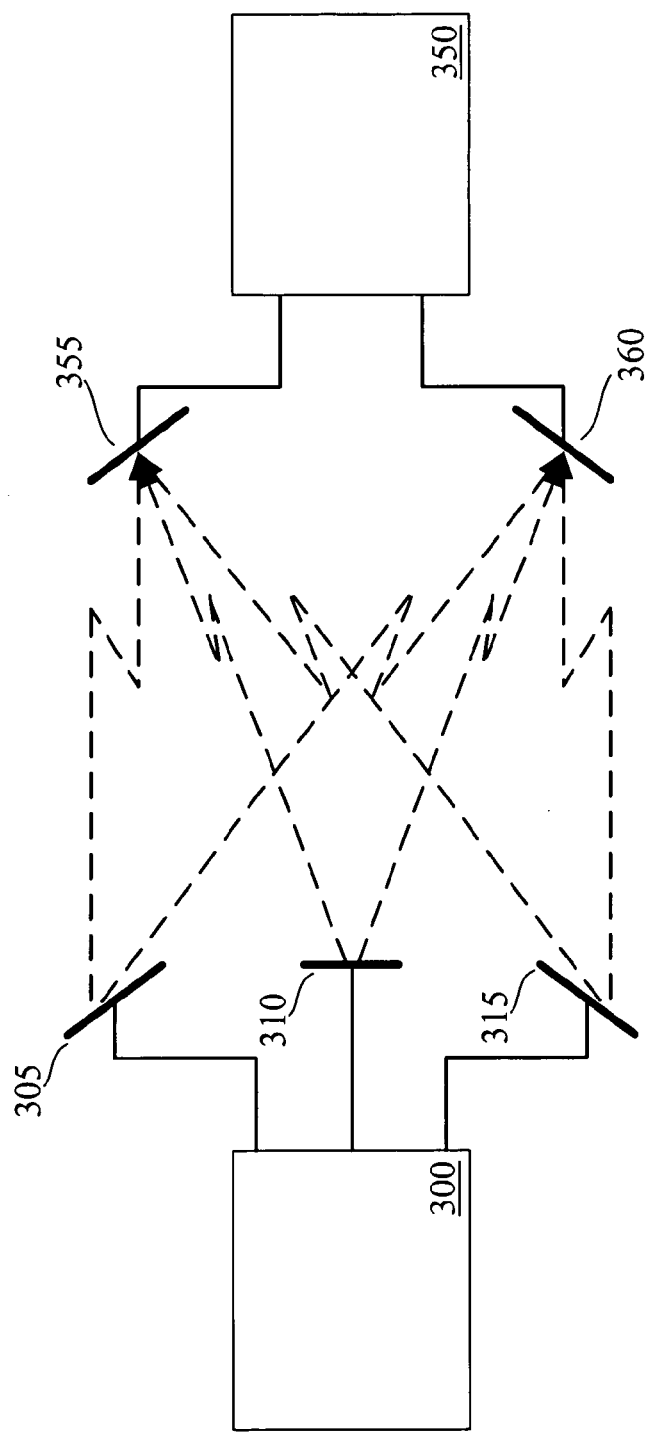
FIG. 3 shows an embodiment of the invention.

FIG. 3 shows an embodiment of the invention. This embodiment includes a wireless communication system. The wireless communication system includes a transmitter 300. The transmitter 300 includes several transmitter antennae 305, 310, 315. The transmitter antennae 305, 310, 315 are spatially separated from each other. Additionally, each transmitter antenna 305, 310, 315 includes a transceiver antenna polarization orientation. At least one of the transmitter antennae has a transceiver antenna polarization that is different than at least one of the other transmitter antennae.

The embodiment of FIG. 3 further includes a receiver 350. The receiver 350 includes receiver antennae 355, 360. The receiver antennae 355, 360 are spatially separated from each other. Additionally, each receiver antennae 355, 360 includes a receiver antenna polarization orientation. At least one of the receiver antennae has a receiver antenna polarization that is different than at least one of the other receiver antennae.

The multiple transmitter antennae and multiple receiver antennae allow the wireless communication system to include spatial multiplexing and communication diversity. As described earlier, spatial multiplexing and communication diversity can improve the capacity of the communication system and reduce the effects of fading and multi-path resulting in increased capacity.

Radio Frequency (RF) signals are coupled between the transmitter antennae and the receiver antennae. The RF signals are modulated with data streams. The signals transmitted from the transmitter antennae can be formed from different data streams (spatial multiplexing) or from one data stream (communication diversity) or both.

The transmitter antenna polarization of the transmitter antennae and the receiver antenna polarization of the receiver antennae can be preset to optimize the ability of the receiver to separate the transmitted data streams after the composite signals have been received by receiver antennae of the receiver.

Antennae with multiple polarizations can be used in wireless communication systems to mitigate fading through diversity techniques. Additionally, antennae with multiple polarizations can be used to increase spectral efficiency. For communication diversity utilizing multiple polarization, separate copies of the same data streams are transmitted and/or received using multiple polarized antennae.

Each receiver antenna 355, 360 receives signals from each of the transmitter antennae 305, 310, 315. The difference of the received signal power at a receiver antenna which has the same polarization as the transmitting antenna, and the received signal power when the receiver antenna has a different polarization state can be referred to as cross polarization discrimination (XPD). For example, if the receiving antenna has a polarization state that is the same as the polarization state of the transmitting antenna, the theoretical XPD is zero.

The difference in the polarization states of a transmitter antenna and a receiver antenna affects the XPD of a signal transmitted between the transmitter antenna and the receiver antenna. For example, a first transmitter antenna 305 has approximately the same polarization state (approximately 135 degrees) as a first receiver antenna 355. Therefore, the XPD of a signal coupled between the first transmitter antenna 305 and the first receiver antenna 355 is approximately zero. A second transmitter antenna 315 has approximately the same polarization state (approximately 45 degrees) as a second receiver antenna 360. Therefore, the XPD of a signal coupled between a second transmitter antenna 315 and a second receiver antenna 360 is approximately zero. The second transmitter antenna 315 has a polarization state that is approximately ninety degrees different than the polarization state of the first receiver antenna 355. Therefore, the XPD of a signal coupled between the second transmitter antenna 315 and the first receiver antenna 355 is relatively large. The first transmitter antenna 305 has a polarization state that is approximately ninety degrees different than the polarization state of the second receiver antenna 360. Therefore, the XPD of a signal coupled between the first transmitter antenna 305 and a second receiver antenna 360 is relatively large. A third transmitter antenna 310 has a polarization state that is approximately forty five degrees different than the polarization state of the first receiver antenna 355 and the second receiver antenna 360. Therefore, the XPD of a signal coupled between the third transmitter antenna and either the first receiver antenna 355 or the second receiver antenna 360 is somewhere between zero and the previously described relatively large XPD.

The value of the XPD is dependent upon several different factors. The primary factor is the polarization orientation of the transmitting antenna to the polarization orientation of the receiving antenna. Other factors include the distance between the transmitter antennae and the receiver antennae, the K-factor (defined later), shadow fading, antenna heights and the degree of environmental scattering.

The distance between the transmitter antennae and the receiver antennae can influence the XPD values between the transmitter antennae and the receiver antennae. The XPD values can be large for transmitter antennae and the receiver antennae that are within small cells, and therefore, only a short distance of each other. With proper polarization orientations, XPD values as great as 15 dB can be realized. For larger transmit-receive distances that include more scattering by the environment, the XPD values are smaller. With proper polarization orientations, XPD values can average 2–6 dB.

The XPD values are also dependent on the amount of line of sight (LOS) signal power between the transmit antenna and the receive antenna. The K-factor is defined as a ratio of the fixed LOS signal power and the scattering component power. The greater the K-factor, the less pronounced cross coupling between the different polarization states. Therefore, the greater the XPD values.

The K-factor can generally be improved by increasing the heights of the antennae. Additional antenna height generally improves the LOS, and therefore, the K-factor and XPD values.

Shadow fading caused by obstacles between the transmitter antennae and the receiver antennae reduces the LOS, and therefore, reduces the K-factor and the XPD values.

Channel Matrix

Assuming a transmission channel having a flat frequency response (no significant multipath delay spread), the input-output relationship of the transmission channel between the transmitter and the receiver of a general wireless system can be represented by:

$$Y(k)=HS(k)+N(k)$$

where H is a channel matrix that represents the transmission channel, and N(k) represent additive noise. The dimensions of the channel matrix H is dependent upon the number of transmitter antennae and the number of receiver antennae.

Assuming m signals are transmitted from m spatial-wise and polarization-wise distributed transmit antennae, the transmit signals can be represented as:

$S(k)=[s_1(k), s_2(k), \ldots, s_m(k)]$, where $s_1(k), s_2(k), \ldots, s_m(k)$ are the data symbols being transmitted from the m transmit antennae.

The transmit signals can include independent signals, or the signals can be correlated through the use of a pre-coder.

Assuming n receive antennae receive the transmitted signals, a vector representation of the received signal can be represented as:

$Y(k)=[y_1(k), y_2(k), \ldots, y_n(k)]$, where $y_1(k), y_2(k), \ldots, y_n(k)$ are data symbols being received by the n receiver antennae.

Therefore, with m transmitter antennae and n receiver antennae, H is represented by:

$$H = \begin{bmatrix} h_{11} & h_{12} & \cdots & h_{1m} \\ h_{21} & & \vdots & \vdots \\ \vdots & \cdots & h_{ij} & \vdots \\ h_{n1} & \cdots & \cdots & h_{nm} \end{bmatrix}$$

where $h_{ij}$ is a complex number that represents the channel between transmitter antenna j and receiver antenna i.

The channel matrix H can be estimated by training the channel. Training the channel includes transmitting known sequences of symbols, and detecting the received symbols. An estimate of the channel can be determined by comparing the estimated received symbols with the known symbols that were actually transmitted. The training sequence can be repeated at predetermined time intervals.

If the channel includes multipath delay spread, then the effects of the delay spread can be minimized by transmitting the symbol streams with multiple carrier signals. The multiple carrier signal can be transmitted according to an orthogonal frequency division multiplexing (OFDM) format. When multi-carrier modulation such as OFDM is used, the symbol duration is chosen to be much longer than the channel delay spread. Multiple carrier and OFDM transmission signals are well known in the art of communication systems.

Generally, if a multiple carrier transmission signal format is used, a channel matrix must be estimated for each carrier signal. For a channel having a delay spread, a single carrier system requires the receiver to have an equalizer to cancel out inter symbol interference (ISI). The channel should be estimated to determine time domain channel taps of the equalizer.

The Receiver

The receiver should provide an accurate estimate of the symbols input to the transmitter. Generally, the receiver is implemented with either non-linear filters or linear filters.

Examples of non-linear filter receivers include a maximum likelihood sequence estimator (MLSE) and a decision feedback estimator (DFE). Both of these types of filters are well known in the art of receiver design. Examples of linear filter receivers include Zero Forcing (ZF) and minimum mean squared error (MMSE).

Linear filters offer the advantage of low complexity. A linear filter can include m filters of n×1 dimension that are weighted w1, w2, . . . wm and have complex valued taps. Estimates of the input symbols can be recovered by multiplying the taps with the received symbols. That is, $\hat{S}j(k)=wj^*Y(k)$ where $\hat{S}j(k)$ is an estimate of Sj(k), for j=1 . . . m.

Estimates of the received symbols can be expressed as:
$\hat{S}(k)=RY(k)$, where R is a receive processing matrix.

For a Zero Forcing (ZF) filter receiver, $R=H^{-1}$. Therefore, $S=H^{-1}Y(k)$. However, $Y(k)=Hs(k)+N(k)$, where S(k) is the transmitted symbol set. Therefore, $\hat{S}(k)=H^{-1}HS(k)+H^{-1}N(k)$.

The noise component, $H^{-1}N(k)$ becomes large when a singular value spread or an eigenvalue spread of H becomes large. The singular value spread and eigenvalue spread of the channel matrix will be described in greater detail later. Therefore, the noise component of the estimated received signal is minimized and the separability of the received signal is optimized when the singular value spread or eigenvalue spread of the channel matrix H is minimized. Generally, when the singular values or eigenvalues are normalized to one, minimizing the spread ensures that all of the singular values or eigenvalues are nearly equal to one.

Singular Value Spread

The separation of the received signal can be optimized by properly setting the polarization states of the antennae. The optimal polarization can be determined by minimizing a singular value spread of the channel matrix H. The channel matrix generally includes several singular values.

The $i^{th}$ singular value of H(n×m) can be defined as $Svi=(\lambda i)^{1/2}$, where $\lambda i$ is determined by solving the characteristic matrix:
Det($H^HH-\lambda I$)=0, where Det(X) is the determinant of X, and n>=m.

Singular value spread can be defined as Svi (max)/Svi (min).

For multi-carrier signals, a single polarization setting must be used for all carrier signals that are simultaneously transmitted between multiple transmitter antennae and multiple receiver antennae. Each of the channel matrices of each carrier signal includes a separate set of singular values and a unique singular value spread. The optimal polarization setting can be determined by minimizing an average of the singular value spreads.

Correlation Coefficient

The correlation coefficient is calculated within the receiver by comparing signals received by two different receiver antennae. The receiver includes down-conversion and demodulation circuitry, and sampling circuitry that generates digital samples from signals received by each antenna. The requisite electronic processing is well known in the art of digital signal processing.

A method of calculating the correlation coefficient ($r_{xy}$) of two received zero mean signals x and y, includes solving the following:

$$\text{Correlation coefficient } (r_{xy}) = \frac{E\{xy^*\}}{\sqrt{E\{|x|^2\}}\sqrt{E\{|y|^2\}}}$$

where E {v} is the expected value of v.

The signal processing required to implement the singular value/eigenvalue and correlation coefficient calculations are well known in the art of communication systems and digital signal processing. The receiver demodulates the received signals and then generates digital samples from the demodulated signals. The digital samples are used to generate estimates of the transmitted symbols and for generating the above-described values/coefficients.

As has been described, minimizing the singular value spread optimizes the separability and maximizing the de-correlation enables the receiver to more accurately estimate the received signals. Minimizing the singular value spread and maximizing the de-correlation generally requires characterizing the channel matrix.

Before deployment of cellular wireless systems, a channel matrix can be experimentally estimated and characterized. Channel measurements can be made to learn information about the channel parameters of a typical cellular channel. Parameters that can be estimated include the K-factor, shadow fading and scattering. The estimated channel matrix and channel parameters can be used to determine polarization settings of the transmitter and receiver antennas to optimize the spatial separability or de-correlation of the received signals.

A Spatial Polarization Example

Figure 4:
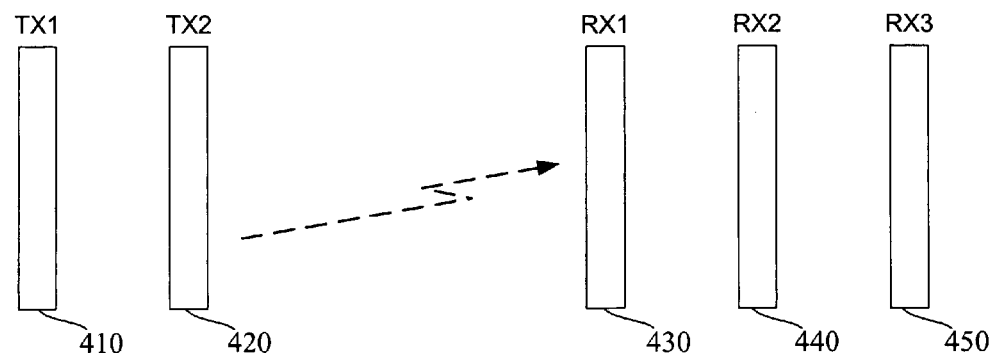
FIG. 4 shows transmitter antennae and receiver antennae that all have the same polarization state.

FIG. 4 shows transmitter antennae and receiver antennae that all have the same polarization state. Transmitter antennae 410, 420 have the same polarization state as receive antennae 430, 440, 450.

The channel matrix can be modeled by:

$$H = \begin{bmatrix} \alpha_{11} & \alpha_{12} \\ \alpha_{21} & \alpha_{22} \\ \alpha_{31} & \alpha_{32} \end{bmatrix}$$

where the correlation between elements is a function of the antenna spacing. A correlation of 0.7 can typically be achieved with a reasonable spacing between antennas (a couple of wavelengths).

Figure 5:
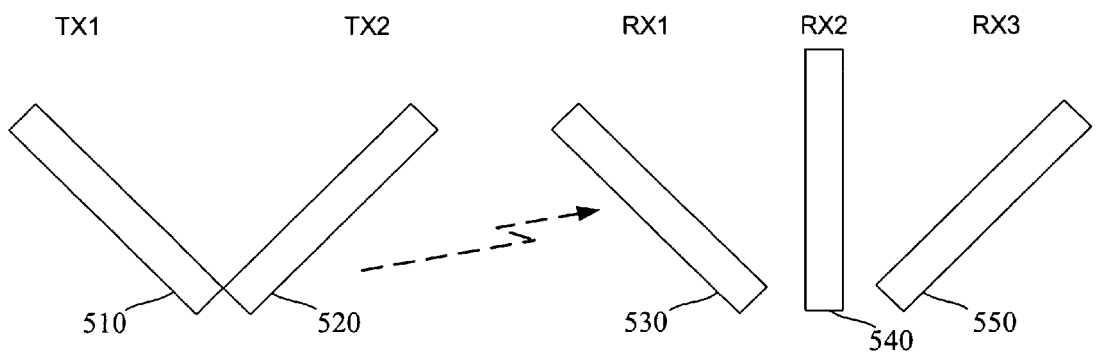
FIG. 5 shows transmitter antennae and receiver antennae that have varying polarization states.

FIG. 5 shows transmitter antennae and receiver antennae that have varying polarization states. Transmitter antenna 510 has approximately the same polarization state (approximately 135 degrees) as receiver antenna 530. Transmitter antenna 520 has approximately the same polarization state (approximately 45 degrees) as receiver antenna 550. Receiver antenna 540 has a polarization state of approximately 90 degrees.

Due to the polarization mismatch between some of the transmitter antennas and the receiver antennas, the channel matrix can be modeled by:

$$H = \begin{bmatrix} \alpha_{11} & XPD(90)*\alpha_{12} \\ XPD(45)*\alpha_{21} & XPD(45)*\alpha_{22} \\ XPD(90)*\alpha_{31} & \alpha_{32} \end{bmatrix}$$

where XPD(45) denotes the XPD factor accounting for a power loss due to a 45 degree mismatch in polarization. XPD(90) accounts for a 90 degree polarization mismatch. Note that arbitrary angle mismatch can be used in practice. Note also the XPD value varies with the amount of scattering and multipath in the environment (loss decreases as scattering increases). The correlation between the channel entries decreases with angle mismatch.

Figure 6A:
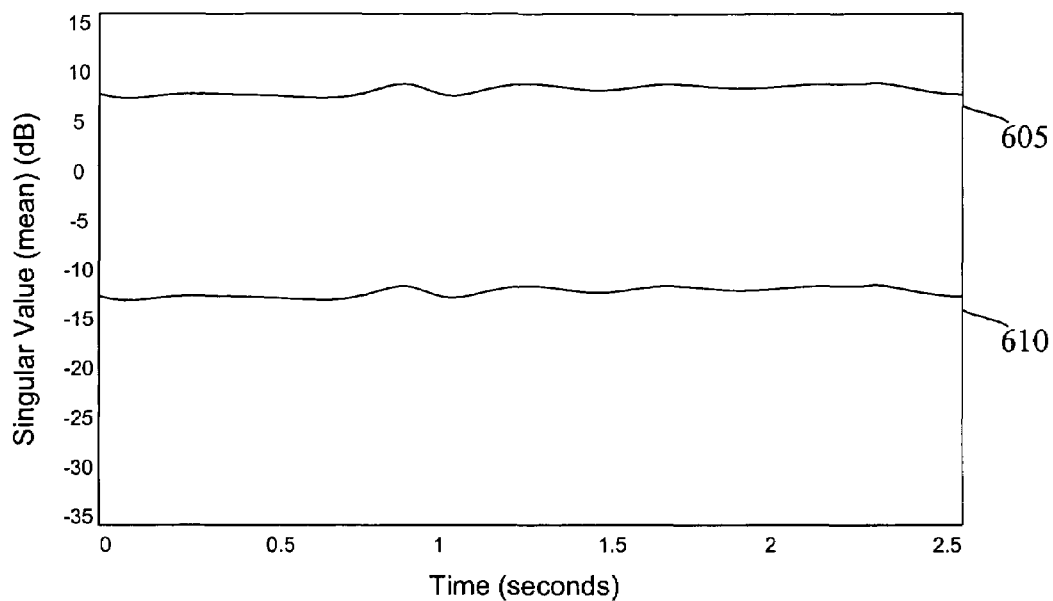
FIG. 6a is a plot of the singular values versus time for the system of FIG. 6 that includes spatially separate antennae having the same polarization states and a K-factor of 6 dB.
Figure 6B:
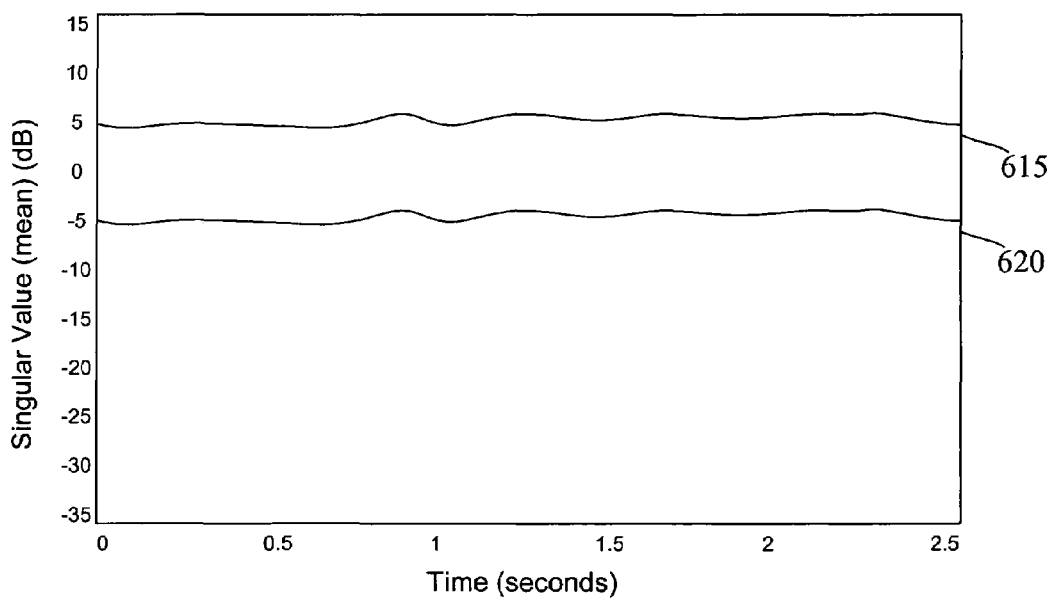
FIG. 6b is a plot of the singular values versus time for the system of FIG. 7 that includes spatially separate antennae having different polarization states and a K-factor of 6 dB.
Figure 7A:
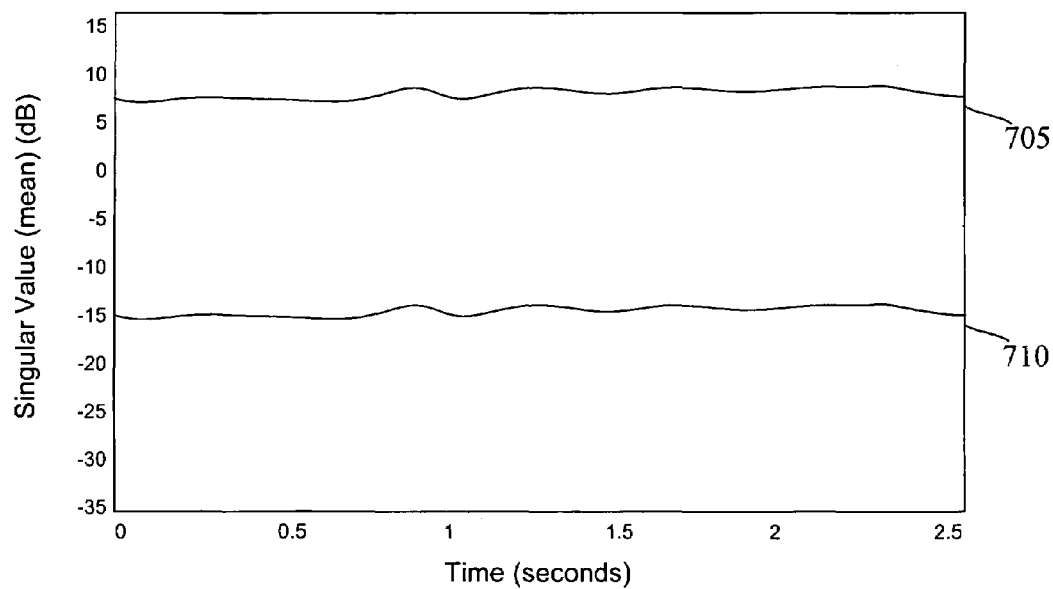
FIG. 7a is a plot of the singular values versus time for the system of FIG. 6 that includes spatially separate antennae having the same polarization states and a K-factor of 10 dB.
Figure 7B:
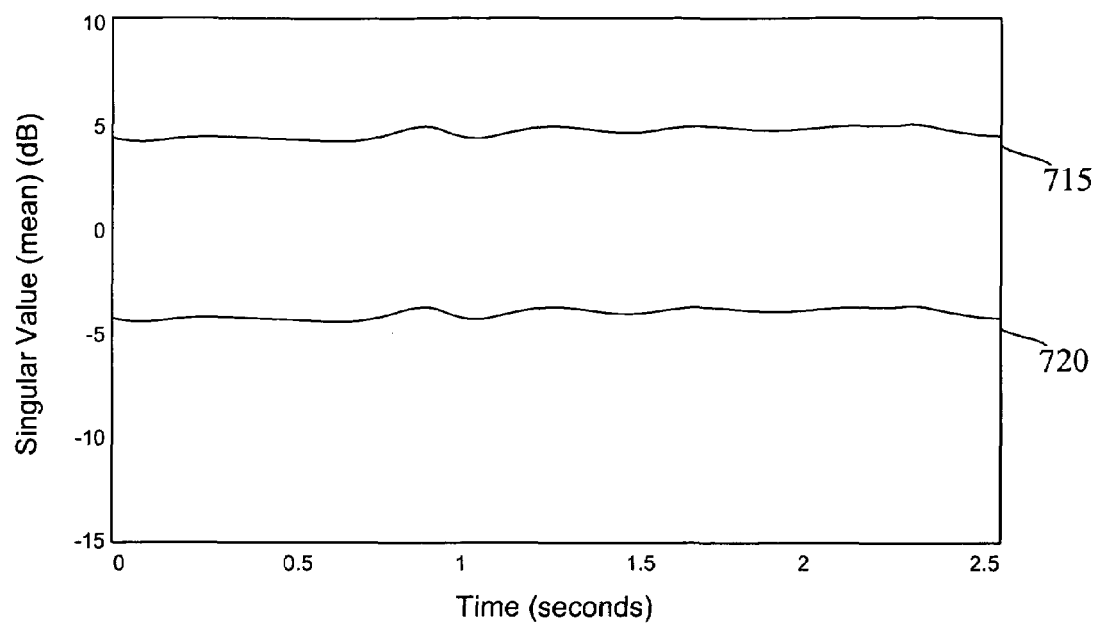
FIG. 7b is a plot of the singular values versus time for the system of FIG. 7 that includes spatially separate antennae having different polarization states and a K-factor of 10 dB.

The plots of FIGS. 6a, 6b, 7a, 7b illustrate the gain obtained by combining spatial and polarization wise distributed antennas. FIGS. 6a, 7a include vertically polarized two transmitter antennae, three receiver antennae systems with a correlation of 0.6. FIGS. 6b, 7b include multi-polarized two transmitter antennae, three receiver antennae systems with a correlation of 0.2 between orthogonally polarized antennas and a correlation of 0.5 between antennas having a forty-five degree mismatch. FIGS. 6a, 6b include a K-factor of 6 dB, and FIGS. 7a, 7b include a K-factor of 10 dB to show the impact of increasing line of sight in the channel.

FIG. 6a is a plot of the singular values (averaged across small scale fades) versus time for the system of FIG. 4 that includes spatially separate antennae having the same polarization states and a K-factor of 6 dB. The system of FIG. 4 includes two transmitter antennae and three receiver antennae. Therefore the channel matrix H has two singular values. The first singular value 605 has an average value of about 7.5 dB relative to a normalized reference. The second singular value 610 has an average value of about -12.5 dB. Therefore, the resulting singular value spread is about 7.5+12.5=20 dB.

FIG. 6b is a plot of the singular values versus time for the system of FIG. 5 that includes spatially separate antennae having the different polarization states and a K-factor of 6 dB. Again, the channel matrix H has two singular values. The first singular value 615 has an average value of about 5 dB. The second singular value 620 has an average value of about -5 dB. Therefore, the resulting singular value spread is about 5+5=10 dB. The system of FIG. 5 provides a singular value spread that is 10 dB less than the singular value spread of the system of FIG. 4, and therefore, has a better noise enhancement performance.

Figure 6C:
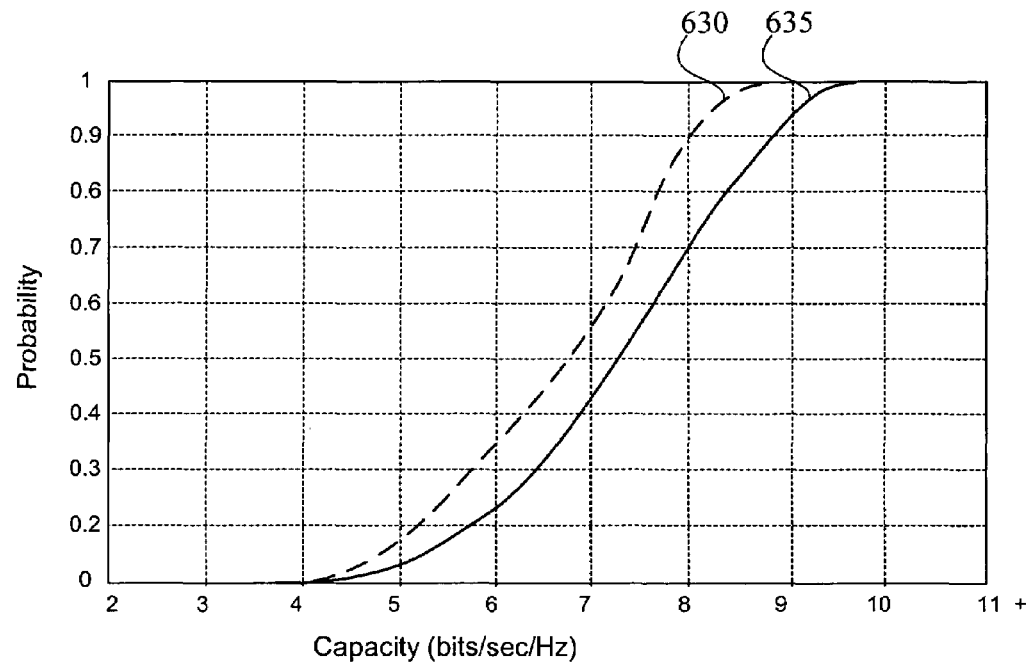
FIG. 6c is a plot that shows the capacity of the systems of FIG. 6 and FIG. 7 with a K-factor of 6 dB.

FIG. 6c is a plot that shows the capacity of the systems of FIG. 4 and FIG. 5 with a K-factor of 6 dB. As shown in FIG. 6c, the capacity of the system of FIG. 5 (denoted with line 635) is greater than the capacity of the system of FIG. 4 (line 630). The probability axis indicates the probability that a receiver can receive information at the specified capacity or less. The capacity axis indicates the capacity of the channel for the specified antenna polarization settings.

FIG. 7a is a plot of the singular values versus time for the system of FIG. 4 that includes spatially separate antennae having the same polarization states and a K-factor of 10 dB. Again, the channel matrix H has two singular values. The first singular value 705 has an average value of about 7.5 dB relative to a normalized reference. The second singular value 710 has an average value of about -15 dB. Therefore, the resulting singular value spread is about 7.5+12.5=22.5 dB.

FIG. 7b is a plot of the singular values versus time for the system of FIG. 5 that includes spatially separate antennae having the different polarization states and a K-factor of 10 dB. Again, the channel matrix H has two singular values. The first singular value 715 has an average value of about 4 dB. The second singular value 720 has an average value of about 4 dB. Therefore, the resulting singular value spread is about 5+5=8 dB. The system of FIG. 5 provides a singular value spread that is 14.5 dB less than the singular value spread of the system of FIG. 4.

Figure 7C:
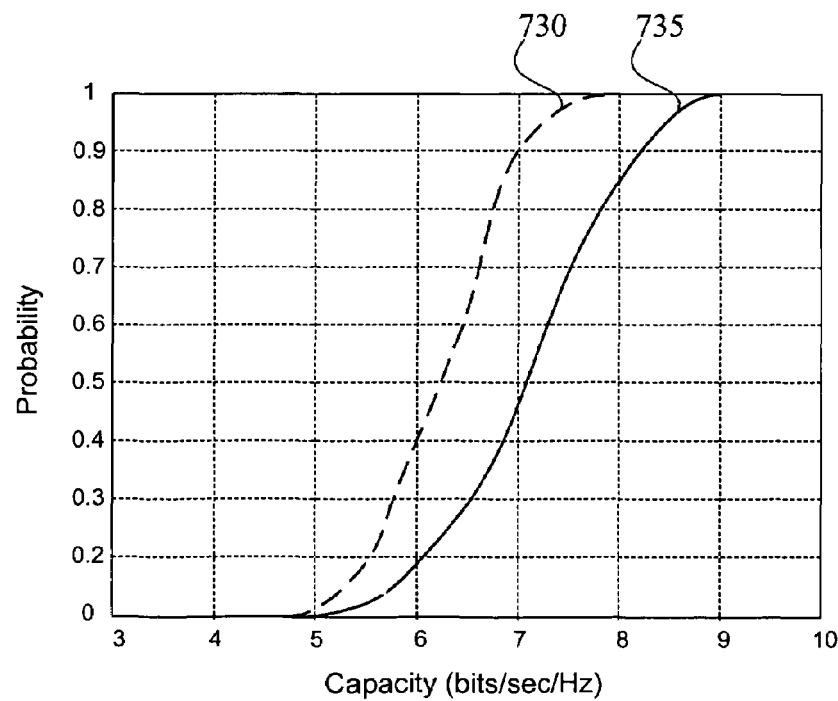
FIG. 7c is a plot that shows the capacity of the systems of FIG. 6 and FIG. 7 with a K-factor of 10 dB.

FIG. 7c is a plot that shows the capacity of the systems of FIG. 4 and FIG. 5 with a K-factor of 10 dB. As shown in FIG. 7c, the capacity of the system of FIG. 5 (denoted with line 735 is greater than the capacity of the system of FIG. 4 (line 730). The probability axis indicates the probability that a receiver can receive information at the specified capacity or less. The capacity axis indicates the capacity of the channel for the specified antenna polarization settings.

As shown in FIGS. 6a, 6b, 6c, 7a, 7b and 7c, the multi-polarized two transmitter antennae, three receiver antennae system provides much better separability and diversity of spatially multiplexed data streams than the vertically polarized two transmitter antennae, three receiver antennae system. Prior to system deployment, experimental studies and analysis similar to the above can be performed to determine the most suitable polarization states for the transmitter antennas and the receiver antennas to optimize spatial separability and/or signal de-correlation.

Figure 8:
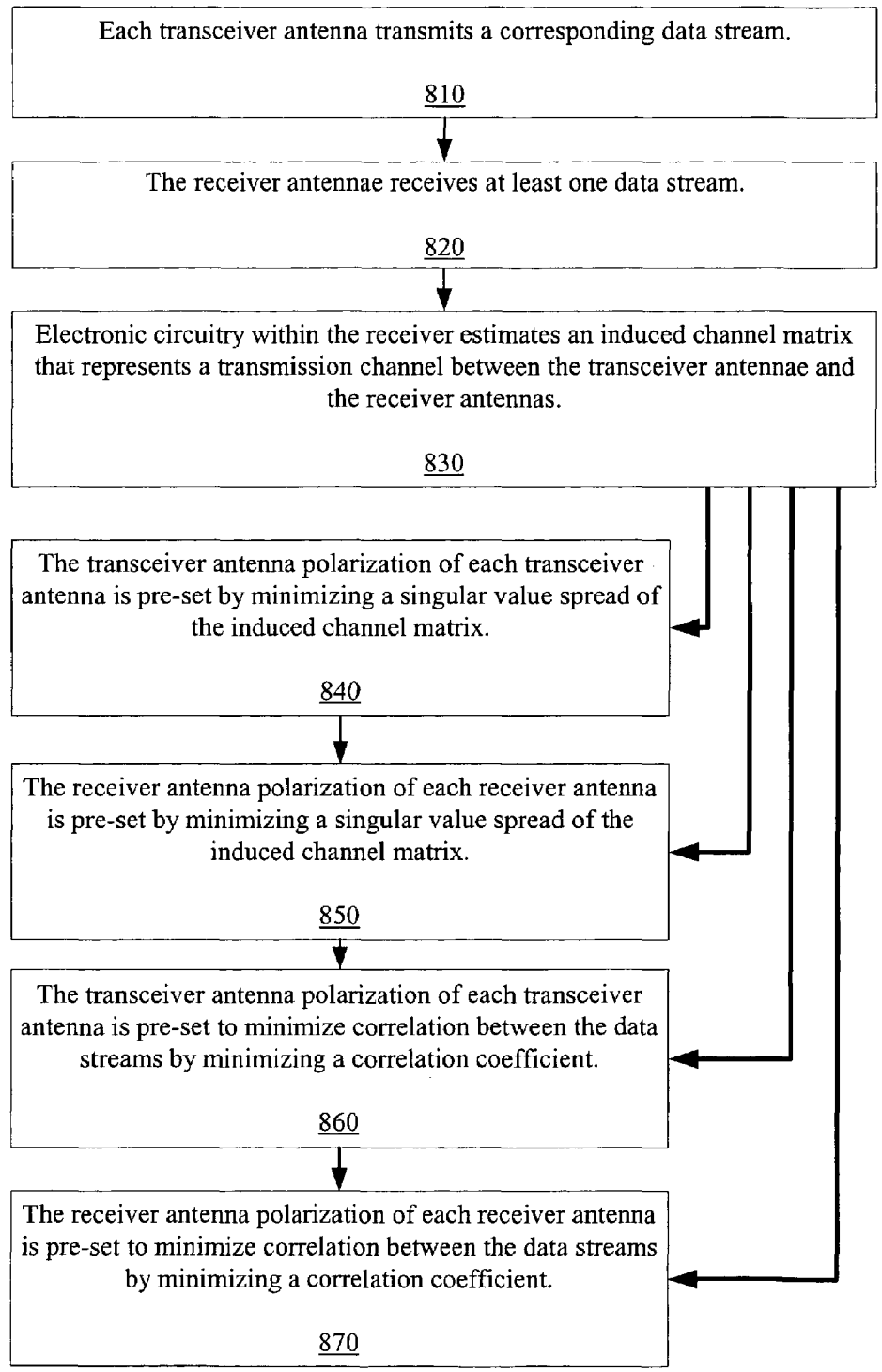
FIG. 8 is a flow chart that includes procedures for pre-setting the polarization of the antennae according to an embodiment of the invention.

FIG. 8 is a flow chart for selecting the polarization of the antennae according to an embodiment of the invention. A first step 810 includes each transceiver antenna transmitting a corresponding data stream. A second step 820 includes the receiver antennae receiving at least one data stream. A third step 830 electronic circuitry within the receiver estimating channel matrices that represents the transmission channels between the transceiver antennae and the receiver antennae. A fourth step 840 includes pre-setting the transceiver antenna polarization of each transceiver antenna by minimizing a singular value spread of the channel matrix.

The embodiment of FIG. 8 can additionally include a fifth step 850 that includes pre-setting the receiver antenna polarization of each receiver antenna by minimizing a singular value spread of the channel matrix.

The embodiment of FIG. 8 can additionally include a sixth step 860 that includes pre-setting the transceiver antenna polarization of each transceiver antenna to minimize correlation between the data streams by minimizing a correlation coefficient of the channel matrix.

The embodiment of FIG. 8 can additionally include a seventh step 870 that includes pre-setting the receiver antenna polarization of each receiver antenna to minimize correlation between the data streams by minimizing a correlation coefficient of the channel matrix.

Polarization Setting Optimization

Figure 9:
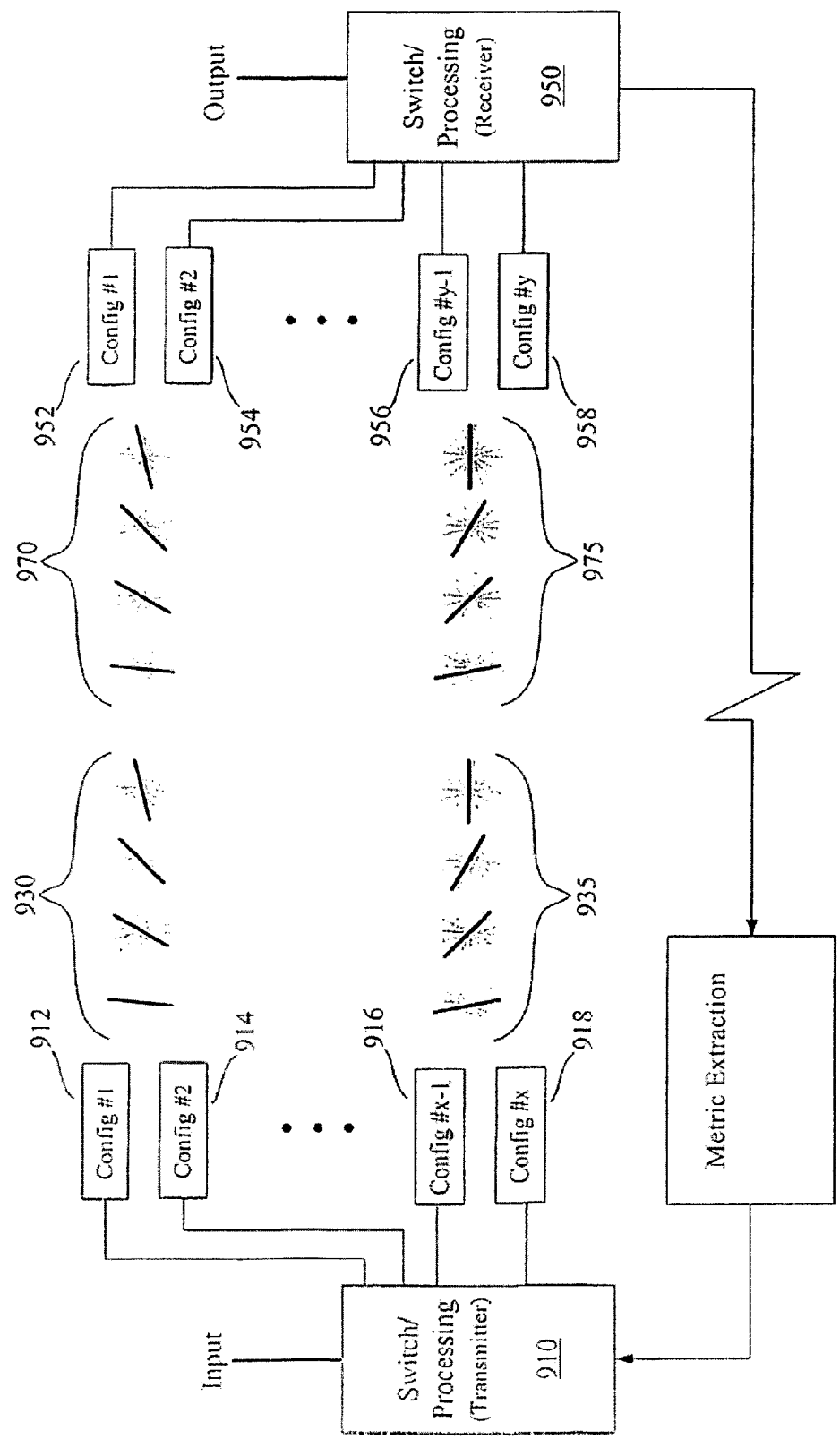
FIG. 9 shows another embodiment of the invention that includes a method and apparatus that includes the polarization states or settings of the transmit and/or receiver antennae being adaptively adjusted to optimize the separability or de-correlation of the received data stream signals.

FIG. 9 shows another embodiment of the invention. This embodiment includes the polarization states or settings of the transmit and/or receiver antennae being adaptively adjusted to optimize the separability or de-correlation of the received data signals.

A switch/processing transmitter 910 receives a stream of data symbols that are to be transmitted. The switch/processing transmitter 910 is connected to several transmitter antennae configuration settings 912, 914, 916, 918. The switch/processing transmitter 910 processes the stream of input data symbol generating multiple processed data streams based on the stream of input data symbols received by the switch/processing transmitter 910. Each of the processed data streams modulate RF signals that are coupled to a corresponding transmitter antenna. Each of the transmitter antennae configuration settings 912, 914, 916, 918 include arrays of antennae having varying polarization settings. Two such settings include transmitter antennae settings 930, 935. The switch/processing transmitter 910 selects the desired array. The processed data streams of the switch/processing transmitter 910 can provide spatial multiplexing or communication diversity.

Several receiver antennae configuration settings 952, 954, 956, 958 can receive the transmitted processed data streams. The signals received by the receiver antennae configuration settings 952, 954, 956, 958 are coupled to a switch/processing receiver 950. The switch/processing receiver 950 generally is coupled to only one of the receiver antennae configuration settings 952, 954, 956, 958 at a given time. The receiver antennae configuration settings 952, 954, 956, 958 each include an array of antennae having various polarization settings. Two such settings include receiver antennae settings 970, 975. The switch/processing receiver 950 demodulates the received signals. The demodulated signal includes transmitted symbol streams that the receiver uses to estimate the transmitted symbols.

The switch/processing transmitter 910 and the switch/processing receiver 950 perform the previously described channel training to generate an estimate of the channel matrix. The switch/processing receiver 950 generates estimates of the singular value spread based upon the estimated channel matrix. The estimates of the singular value spread of the channel matrix can be used to determine the optimal transmitter antennae configuration setting 912, 914, 916, 918, and the optimal receiver antennae configuration setting 952, 954, 956, 958.

The polarization settings of the transmitter and receiver antennae can be adaptively optimized by monitoring the singular value spread of the channel matrix while adjusting the polarization settings. The polarization settings are optimized when the singular value spread is minimized. Essentially, each of the transmitter antennae configuration settings 912, 914, 916, 918, and the optimal receiver antennae configuration settings 952, 954, 956, 958 are switch through to determine which combination of configuration settings yields the minimal singular value spread. For ease of complexity, the number of transmitter antennae configuration settings and the receiver antennae configuration settings can be held to a manageable number.

Feedback from the switch/processing receiver 950 to the switch/processing transmitter 910 must be provided in order for the switch/processing transmitter 910 to optimally set the polarization of the transmitter antennae configuration settings 912, 914, 916, 918. The parameters feedback to the switch/processing transmitter 910 generally include the singular value spread and the correlation coefficient. However, the feedback parameter can be the desired transmitter antennae configuration setting.

In the case of a time division duplexing (TDD) where the channel is reciprocal, the selection of the antennae configuration settings can be preformed by analyzing the reverse transmission. Therefore, a dedicated feedback is not required.

As described before, the switch/processing transmitter 910 receives a stream of symbols to be transmitted, and the switch/processing receiver 950 generates a stream of estimated values based on a stream of received values.

Frequency Reuse Structures

The transmitter/receiver structures of FIG. 3, FIG. 5 and FIG. 9 can be repeated to form clusters of a cellular system. Generally, the frequency spectrum allocated for wireless communication is limited. Therefore, transmission frequencies must be reused. However, frequency reuse can cause co-channel interference (CCI) to occur.

Polarization of the transmit and receive antennae can be adjusted or preset to minimize the CCI between the clusters. Typically, the polarization settings for minimizing CCI are determined experimentally.

Although specific embodiments of the invention have been described and illustrated, the invention is not to be limited to the specific forms or arrangements of parts so described and illustrated. The invention is limited only by the claims.

We claim:

1. A wireless communication system comprising:
a plurality of spatially separate transceiver antennae to transmit a corresponding plurality of data streams comprising a communication channel to a remote receiver having a plurality of receiver antennae, each transceiver antenna comprising a transceiver antenna polarization, at least one transceiver antenna having a polarization that is different than at least one other transceiver antenna,
wherein
the communication channel between the transceiver antennae and the receiver antennae is characterized by a channel matrix, and wherein the transceiver antenna polarization of each transceiver antenna is determined by reducing a measure of a singular value spread of the channel matrix to improve a separability of received data streams.

2. The wireless communication system of claim 1, wherein the transceiver antenna polarization of each transceiver antenna is determined experimentally.

3. The wireless communication system of claim 2, wherein the transceiver antenna polarization of each transceiver antenna is experimentally determined by characterizing the separability of received data streams.

4. The wireless communication system of claim 1, wherein each receiver antenna is spatially separate from at least one other receiver antenna, each receiver antenna further comprising a receiver antenna polarization, at least one receiver antenna having a polarization that is different than at least one other receiver antenna.

5. The wireless communication system of claim 1, further comprising a receiver that is connected to the receiver antenna, the receiver including electronic circuitry for estimating the channel matrix that represents the transmission channel between the transceiver antennae and the receiver antennae, the transceiver antenna polarization of each transceiver antenna being determined by reducing the measure of the singular value spread of the channel matrix.

6. The wireless communication system of claim 4, wherein the receiver antenna polarization of each receiver antenna is set to optimize separability of the received data streams.

7. The wireless communication system of claim 6, wherein the receiver antenna polarization of each receiver antenna is determined experimentally.

8. The wireless communication system of claim 1, wherein the transceiver antenna polarization of each transceiver antenna is pre-set to minimize correlation between the data streams.

9. The wireless communication system of claim 8, wherein the pre-set transceiver antenna polarization of each transceiver antenna is determined experimentally.

10. The wireless communication system of claim 9, wherein a transmission channel between the transceiver antennae and the receiver antennae is estimated with a channel matrix, and wherein the pre-set transceiver antenna polarization of each transceiver antenna is experimentally determined by minimizing a correlation coefficient of the channel matrix.

11. The wireless communication system of claim 4, wherein the receiver antenna polarization of each receiver antenna is pre-set to minimize correlation between the data streams.

12. The wireless communication system of claim 11, wherein the pre-set receiver antenna polarization of each receiver antenna is determined experimentally.

13. The wireless communication system of claim 12, wherein a transmission channel between the transceiver antennae and the receiver antennae is estimated with a channel matrix, and wherein the pre-set receiver antenna polarization of each receiver antenna is experimentally determined by minimizing a correlation coefficient of the channel matrix.

14. The wireless communication system of claim 1, further comprising clusters of transceiver antennae, each cluster including a transmission channel, wherein the pre-set transceiver antenna polarization of each transceiver antenna is experimentally determined by minimizing co-channel interference between the clusters.

15. A wireless communication system comprising:
a plurality of spatially separate transceiver antennae to transmit a corresponding plurality of data streams comprising a communication channel to a remote receiver having a plurality of receiver antennae, each transceiver antenna comprising a transceiver antenna polarization, at least one transceiver antenna having a polarization that is different than at least one other transceiver antenna,
wherein
the communication channel between the transceiver antennae and the receiver antennae is characterized by a channel matrix, and wherein the transceiver antenna polarization of each transceiver antenna is adaptively set to reduce a measure of singular value spread of the channel matrix.

16. The wireless communication system of claim 15, wherein the receiver includes electronic circuitry for estimating the channel matrix that represent a transmission channel between the transceiver antennae and the receiver antennae, the transceiver antenna polarization of each transceiver antenna being adaptively set by minimizing the singular value spread of the channel matrix.

17. A method of wirelessly communicating between a transceiver and a receiver within a wireless communication system, the communication system comprising the transceiver, the transceiver comprising a plurality of transceiver antennae, each transceiver spatially separate from at least one other transceiver antenna, each transceiver antenna further comprising a transceiver antenna polarization, at least one transceiver antenna having a polarization that is different than at least one other transceiver antenna, the communication system further comprising the receiver, the receiver comprising a plurality of receiver antennae, the method comprising:
each transceiver antenna transmitting a corresponding data stream; the receiver antennae receiving at least one data stream;
electronic circuitry within the receiver estimating a channel matrix that represents a transmission channel between the transceiver antennae and the receiver antennae; and
pre-setting the transceiver antenna polarization of each transceiver antenna by minimizing a singular value spread of the channel matrix.

18. The method of wirelessly communicating between a transceiver and a receiver within a wireless communication system of claim 17, wherein each receiver antenna is spatially separate from at least one other receiver antenna, each receiver antenna further comprising a receiver antenna polarization, at least one receiver antenna having a polarization that is different than at least one other receiver antenna, the method further comprising:
pre-setting the receiver antenna polarization of each receiver antenna by minimizing a singular value spread of the channel matrix.

19. The method of wirelessly communicating between a transceiver and a receiver within a wireless communication system of claim 17, the method comprising:
pre-setting the transceiver antenna polarization of each transceiver antenna to minimize correlation between the data streams.

20. The method of wirelessly communicating between a transceiver and a receiver within a wireless communication system of claim 18, the method comprising:
presetting the receiver antenna polarization of each receiver antenna to minimize correlation between the data streams.

21. A wireless communication system
a receiver, including one or more receiver antennae, the receiver antennae receiving at least one data stream from a remote transmitter having a plurality of transceiver antennae, at least one transceiver antenna having a polarization that is different from at least one other transceiver antenna, each transceiver antenna corresponding an associated data stream; and
means for setting the transceiver antenna polarization of each transceiver antenna to reduce a measure of singular value spread of a channel max representation of a transmission channel including at least a subset of the data streams between the transceiver antennae and the one or more receiver antennae.

22. The wireless communication system of claim 21, wherein each receiver antenna is spatially separate from at least one other receiver antenna, each receiver antenna further comprising a receiver antenna polarization, at least one receiver antenna having a polarization that is different than at least one other receiver antenna.

23. The wireless communication system of claim 21, the receiver including electronic circuitry to estimate the channel matrix that represents the transmission channel between the transceiver antennae and the receiver antennae, wherein the means for setting the transceiver antenna polarization of each transceiver antenna is responsive to the electronic circuitry.

24. The wireless communication system of claim 22, further comprising means for setting the receiver antenna polarization of each receiver antenna to optimize separability of the received data streams.

25. The wireless communication system of claim 24, wherein a transmission channel between the transceiver antennae and the receiver antennae is estimated with a channel matrix, and wherein the means for setting the receiver antenna polarization of each receiver antenna comprises minimizing a singular value spread of the channel matrix.

26. The wireless communication system of claim 22, further comprising means for setting the receiver antenna polarization of each receiver antenna to optimize de-correlation of the received data streams.

27. The wireless communication system of claim 26, wherein a transmission channel between the transceiver antennae and the receiver antennae is estimated with a channel matrix, and wherein the means for setting the receiver antenna polarization of each receiver antenna comprises minimizing a correlation coefficient of the channel matrix.

28. A wireless communication system of claim 21, wherein the means for setting the transceiver antennae polarization resides within the receiver.

29. A method comprising:

receiving a plurality of signals from a remote transmitter, the remote transmitter transmitting the plurality of signals from two or more transceiver antennae, wherein at least one transceiver antenna has a different polarization than another transceiver antenna;

developing a channel matrix representation of a transmission channel that includes at least a subset of the plurality of received signals; and determining an improved polarization for at least a subset of the transceiver antennae to reduce a singular value spread in the developed channel matrix.

* * * * *